United States Patent
Van Der Auwera et al.

(10) Patent No.: US 10,492,085 B2
(45) Date of Patent: Nov. 26, 2019

(54) REAL-TIME TRANSPORT PROTOCOL CONGESTION CONTROL TECHNIQUES IN VIDEO TELEPHONY

(71) Applicant: QUALCOMM Incorporated, San Diego, CA (US)

(72) Inventors: Geert Van Der Auwera, Del Mar, CA (US); Siping Tao, Pittsburgh, PA (US); Muhammed Coban, Carlsbad, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 142 days.

(21) Appl. No.: 15/405,022

(22) Filed: Jan. 12, 2017

(65) Prior Publication Data

US 2017/0208485 A1    Jul. 20, 2017

Related U.S. Application Data

(60) Provisional application No. 62/279,602, filed on Jan. 15, 2016.

(51) Int. Cl.
*H04J 1/16* (2006.01)
*H04W 24/02* (2009.01)
(Continued)

(52) U.S. Cl.
CPC .......... *H04W 24/02* (2013.01); *H04L 47/11* (2013.01); *H04L 47/12* (2013.01); *H04L 47/26* (2013.01);
(Continued)

(58) Field of Classification Search
None
See application file for complete search history.

(56) References Cited

U.S. PATENT DOCUMENTS

| 8,588,071 | B2 | 11/2013 | Mahkonen |
| 9,197,565 | B2 | 11/2015 | Khanchi et al. |

(Continued)

OTHER PUBLICATIONS

Alvestrand H., et al., "A Google Congestion Control for Real-Time Communication on the World Wide Web; draft-alvestrand-rtcweb-congestion-03.txt", Internet Engineering Task Force, Standard Working Draft, Internet Society (ISOC), Oct. 22, 2012, XP015088196, pp. 1-18.

(Continued)

*Primary Examiner* — Sithu Ko
(74) *Attorney, Agent, or Firm* — Arent Fox, LLP

(57) ABSTRACT

The present disclosure describes a method, an apparatus, and a computer readable medium for congestion control in wireless communications. For example, the example method may include determining a plurality of picture transmission deltas, wherein a picture transmission delta is a difference between transmission times of two consecutive pictures. The example method further includes determining whether congestion associated with receiving real-time transport protocol (RTP) packets is present based on a picture transmission delta jitter, determining a new maximum bit rate based on a current maximum bit rate and a determination that congestion is present, and transmitting the new maximum bit rate to a sending device.

28 Claims, 7 Drawing Sheets

(51) Int. Cl.
    *H04W 28/02*     (2009.01)
    *H04L 12/801*     (2013.01)
    *H04L 12/825*     (2013.01)
    *H04L 12/841*     (2013.01)
    *H04L 29/06*     (2006.01)

(52) U.S. Cl.
    CPC ............ *H04L 47/263* (2013.01); *H04L 47/28* (2013.01); *H04L 47/283* (2013.01); *H04L 65/608* (2013.01); *H04W 28/0284* (2013.01); *H04W 28/0289* (2013.01)

(56) References Cited

U.S. PATENT DOCUMENTS

| | | | |
|---|---|---|---|
| 9,247,448 | B2 | 1/2016 | Gopalan et al. |
| 9,438,853 | B2 | 9/2016 | Van Der Auwer et al. |
| 2003/0152032 | A1* | 8/2003 | Yanagihara .... H04N 21/234354 370/236.1 |
| 2006/0095943 | A1* | 5/2006 | Demircin ........... H04N 21/2365 725/81 |
| 2007/0153916 | A1 | 7/2007 | Demircin et al. |
| 2010/0063805 | A1* | 3/2010 | Bruhn .................... G10L 19/26 704/207 |
| 2011/0013514 | A1* | 1/2011 | Mahkonen ............. H04L 47/18 370/235 |
| 2013/0083656 | A1* | 4/2013 | Wigell .................... H04L 47/12 370/230 |
| 2013/0159495 | A1* | 6/2013 | Wang .................. H04N 19/146 709/224 |
| 2013/0235931 | A1* | 9/2013 | Su ......................... H04N 19/46 375/240.12 |
| 2014/0059167 | A1* | 2/2014 | Gopalan ............... H04W 28/10 709/217 |
| 2014/0071819 | A1* | 3/2014 | Gopalan ............... H04W 28/14 370/230 |

OTHER PUBLICATIONS

International Search Report and Written Opinion issued in International Patent Application No. PCT/US2017/013462, dated May 31, 2017 (14 pages).

Wenger et al., "Codec Control Messages in the RTP Audio-Visual Profile with Feedback (AVPF)", Network Working Group—Request for Comments: No FRC 5104; Feb. 2008, pp. 1-64.

* cited by examiner

US 10,492,085 B2

REAL-TIME TRANSPORT PROTOCOL CONGESTION CONTROL TECHNIQUES IN VIDEO TELEPHONY

CLAIM OF PRIORITY

The present application for patent claims priority to U.S. Provisional Patent Application No. 62/279,602, filed Jan. 15, 2016, entitled "Real-Time Transport Protocol (RTP) Congestion Control (RCC) Techniques in Video Telephony," which is assigned to the assignee hereof, and hereby expressly incorporated by reference in its entirety herein.

BACKGROUND

Aspects of this disclosure relate generally to telecommunications, and more particularly to techniques for congestion control related to transmission of video data.

Video telephony (VT) involves real-time communication of packets carrying audio and video data. A VT device includes a video encoder that obtains video from a video capture device, such as a video camera or video archive, and generates video packets. Similarly, an audio encoder in a VT device obtains audio from an audio capture device, such as a microphone or speech synthesizer, and generates audio packets. The video packets and audio packets are placed in a radio link protocol (RLP) queue. A medium access control (MAC) layer unit generates medium access control (MAC) layer packets from the contents of the RLP queue. The MAC layer packets are converted to physical (PHY) layer packets for transmission across a communication channel to another VT device.

In mobile VT applications, a VT device, e.g., a receiving device, receives the physical layer packets via a wireless forward link (FL) (or "downlink") from a base station (e.g., eNB) to the VT device as a wireless terminal (e.g., a user equipment, UE). A VT device transmits the PHY layer packets via a wireless reverse link (RL) (or "uplink") to the base station. Each VT device includes PHY and MAC layers to convert the received PHY and MAC layer packets and reassemble the packet payloads into audio packets and video packets. A video decoder within the VT device decodes the video data for presentation to a user via a display device. An audio decoder within the VT device decodes the audio data for output via an audio speaker.

However, as wireless communication links, e.g., LTE links have varying channel capacities, the receiving device may encounter congestion problems due to various reasons. Therefore, there is a desire for proper congestion control at the receiving device such that the user experience is improved and/or optimized, for example, through avoiding the introduction of packet losses and picture freezes (playout).

SUMMARY

Figure 1:
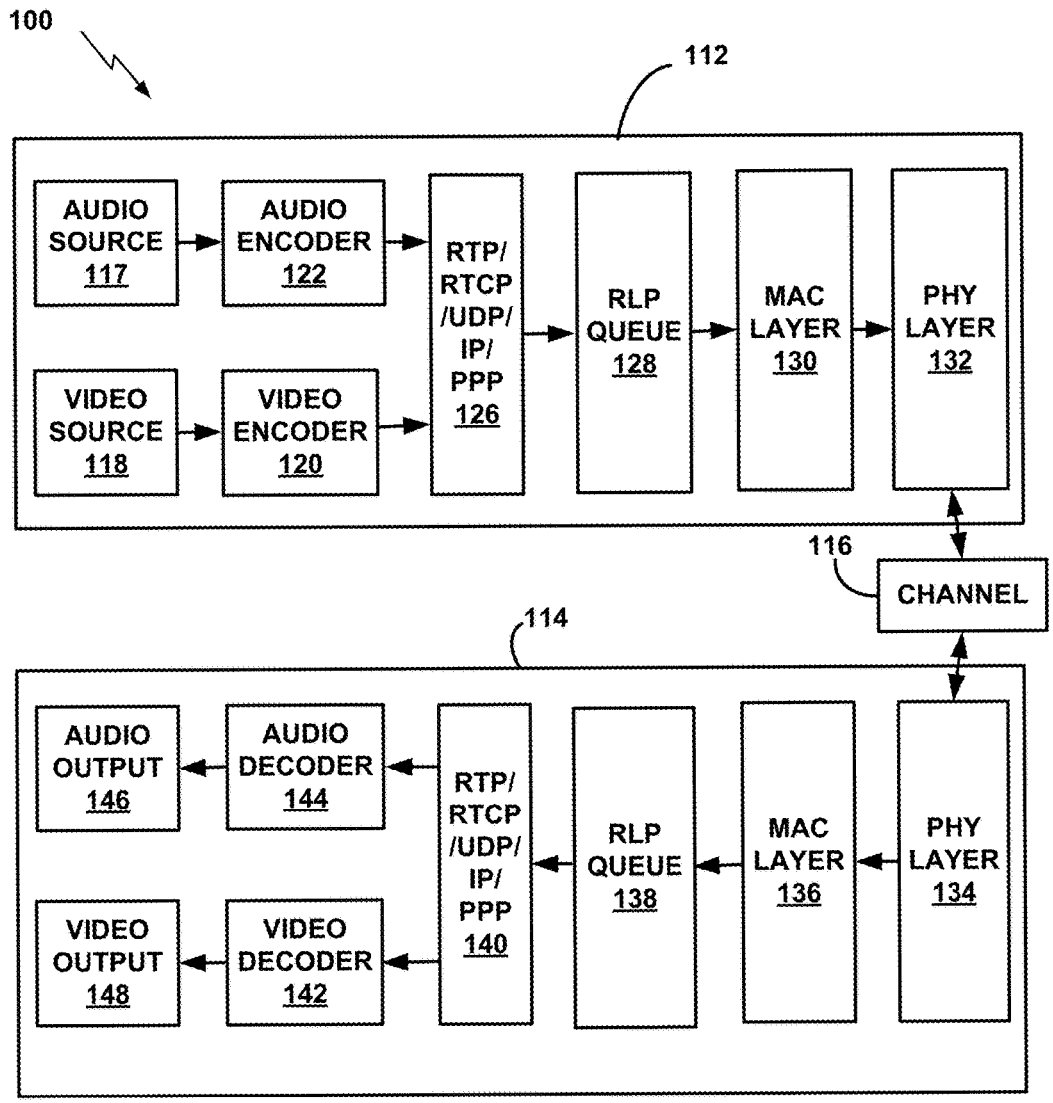
FIG. 1 is a block diagram illustrating an audio/video encoding and decoding system for video telephony (VT) applications.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one example, a method for congestion control at a receiving device in wireless communications is provided. The example method includes determining, at a receiving device, a plurality of picture transmission deltas, wherein a picture transmission delta is a difference between transmission times of two consecutive pictures; determining, at the receiving device, whether congestion associated with receiving real-time transport protocol (RTP) packets is present based on a picture transmission delta jitter; determining, at the receiving device, a new maximum bit rate based on a current maximum bit rate and a determination that congestion is present; and transmitting, from the receiving device, the new maximum bit rate to a sending device.

In another example, an apparatus (e.g., a receiving device/user equipment) for congestion control in wireless communication is provided. The apparatus includes means for determining, at a receiving device, a plurality of picture transmission deltas, wherein a picture transmission delta is a difference between transmission times of two consecutive pictures; means for determining, at the receiving device, whether congestion associated with receiving real-time transport protocol (RTP) packets is present based on a picture transmission delta jitter; means for determining, at the receiving device, a new maximum bit rate based on a current maximum bit rate and a determination that congestion is present; and means for transmitting, from the receiving device, the new maximum bit rate to a sending device.

In a further example, a computer readable medium storing computer executable code for congestion control in wireless communications is provided. The computer medium includes code for determining, at a receiving device, a plurality of picture transmission deltas, wherein a picture transmission delta is a difference between transmission times of two consecutive pictures; code for determining, at the receiving device, whether congestion associated with receiving real-time transport protocol (RTP) packets is present based on a picture transmission delta jitter; code for determining, at the receiving device, a new maximum bit rate based on a current maximum bit rate and a determination that congestion is present; and code for transmitting, from the receiving device, the new maximum bit rate to a sending device.

Additionally, in another example, an apparatus (e.g., a receiving device/user equipment) for congestion control in wireless communication is provided. The apparatus includes a memory configured to store data; and one or more processors communicatively coupled with the memory, wherein the one or more processors and the memory are configured to: determine, at a receiving device, a plurality of picture transmission deltas, wherein a picture transmission delta is a difference between transmission times of two consecutive pictures; determine, at the receiving device, whether congestion associated with receiving real-time transport protocol (RTP) packets is present based on a picture transmission delta jitter; determine, at the receiving device, a new maximum bit rate based on a current maximum bit rate and a determination that congestion is present; and transmit, from the receiving device, the new maximum bit rate to a sending device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Video telephony (VT) devices may be connected via a wired or wireless network for conducting a VT session (e.g., transmission of audio and/or video data between the VT devices). A VT device that is processing audio and/or video data for transmission to another VT device may be referred to as a sender device. Likewise, a VT device that is processing received audio and/or video data (e.g., for presentation to a user of the VT device) may be referred to as a receiver device.

The sender device may encode audio and/or video data at a particular rate (which may be interchangeably referred to herein as a bit rate). The sender device may select the rate based on network conditions. For example, the sender device may select the rate based on a maximum (or near maximum) bit rate supported by the network being used for the VT session. In this way, the sender device may prepare the data to be sent using the relatively highest quality supported by the network without exceeding the limitations of the network. However, network conditions may affect the maximum bit rate supported by the network.

In some instances, the techniques described herein may be performed by a Multimedia Telephony Service for IP Multimedia Subsystem (IMS) (MTSI) device, for example, a receiving device and/or a sending device. For example, the MTSI device may perform bit rate adaptation and/or congestion control using the techniques described herein, for example, for processing of input signal, jitter adaptive thresholding, and/or rate adjustment.

FIG. 1 is a block diagram illustrating an encoding and decoding system 100. As shown in FIG. 1, system 100 includes an encoder system 112, e.g., a sending device, which may be an eNB or a user equipment (UE), and a decoder system 114, e.g., a receiving device, which may be a UE or an eNB, connected by a transmission channel 116, a wireless/wireline channel. In the example of FIG. 1, encoder system 112 may be associated with a first video communication device, e.g., an eNB, and includes an audio source 117, video source 118, video encoder 120, audio encoder 122, real-time transport protocol (RTP)/real-time transport protocol (RTCP)/user datagram protocol (UDP)/ Internet protocol (IP)/point-to-point protocol (PPP) conversion unit 126, radio link protocol (RLP) queue 128, MAC layer unit 130, and/or physical (PHY) layer unit 132. Decoder system 114 may be associated with another video communication device, e.g., a UE, and includes a PHY layer unit 134, MAC layer unit 136, RLP queue 138, RTP/RTCP/ UDP/IP/PPP conversion unit 140, video decoder 142, audio decoder 144, audio output device 146, and/or video output device 148. It should be noted both network devices and UEs can be sending devices or receiving devices, and this figure is not intended to be a networking figure, as such, the channel is also not intended to be limited to a wireless channel.

As described in more detail below, encoder system 112 and/or decoder system 114 may use the techniques of this disclosure to modify an encoding rate based on network conditions. For example, video encoder 120 may control the video source encoding rate, at least in part, as a function of bandwidth/quality of channel 116. In particular, video encoder 120 may reduce an encoding rate of video and/or audio data in response to a reduction in a network link rate. Likewise, video encoder 120 may increase an encoding rate of video and/or audio data in response to an indication of underutilization of a network link rate.

System 100 may provide bi-directional video and audio transmission, e.g., for video telephony via transmission channel 116. Accordingly, generally reciprocal encoding, decoding, and conversion units may be provided on opposite ends of channel 116. In some implementations, encoder system 112 and decoder system 114 may be embodied within video communication devices such as wireless mobile terminals equipped for video streaming, video telephony, or both. The mobile terminals may support VT according to packet-switched standards such as RTP, RTCP, UDP, IP, or PPP.

For example, at encoder system 112, RTP/RTCP/UDP/ IP/PPP conversion unit 126 adds appropriate RTP/RTCP/ UDP/IP/PPP header data to audio and video data received from video encoder 120 and audio encoder 122 and places the data in RLP queue 128. An example bitstream may include a MAC header, an IP header, a UDP header, an RTCP header, and the payload data. In some examples, RTP/RTCP runs on top of UDP, while UDP runs on top of IP, and IP runs on top of PPP. In some examples, as described herein, RTP/RTCP/UDP/IP/PPP conversion unit 126 conform to a particular standard, such as "RFC 3550: RTP: A Transport Protocol for Real-Time Applications," H. Schulzrinne et al., July 2003, "RFC 5104: Codec Control Messages in the RTP Audio-Visual Provide with Feedback (AVPF)," S. Wenger et al., February 2008 (hereinafter RFC 5104), and/or other applicable standards for real-time or near real-time transport of data. MAC layer unit 130 generates MAC RLP packets from the contents of RLP queue 128. PHY layer unit 132 converts the MAC RLP packets into PHY layer packets for transmission over channel 116.

PHY layer unit 134 and MAC layer unit 136 of decoder system 114 operate in a reciprocal manner. PHY layer unit 134 converts PHY layer packets received from channel 116 to MAC RLP packets. MAC layer unit 136 places the MAC RLP packets into RLP queue 138. RTP/RTCP/UDP/IP/PPP conversion unit 140 strips the header information from the data in RLP queue 138, and reassembles the video and audio data for delivery to video decoder 142 and audio decoder 144, respectively.

System 100 may be designed to support one or more wireless communication technologies such as code division multiple access (CDMA), frequency division multiple access (FDMA), time division multiple access (TDMA), or orthogonal frequency divisional multiplexing (OFDM), or another suitable wireless technique. The above wireless communication technologies may be delivered according to any of a variety of radio access technologies. For example, CDMA may be delivered according to cdma2000 or wideband CDMA (WCDMA) standards. TDMA may be delivered according to the Global System for Mobile Communications (GSM) standard. The Universal Mobile Telecommunication System (UMTS) standard permits GSM or WCDMA operation. Typically, for VT applications, system 100 may be designed to support high data rate (HDR) technologies.

Video encoder 120 generates encoded video data according to a video compression method, such as MPEG-4, High Efficiency Video Coding (HEVC), or another video coding standard. Other video compression methods include the International Telecommunication Union (ITU) H.263, ITU H.264, or MPEG-2 methods. Audio encoder 122 encodes audio data to accompany the video data. Video source 118 may be a video capture device, such as one or more video cameras, one or more video archives, or a combination of video cameras and video archives.

The audio data may be encoded according to an audio compression method, such as adaptive multi-rate narrow band (AMR-NB), or other techniques. The audio source 117 may be an audio capture device, such as a microphone, or a speech synthesizer device. For VT applications, the video will permit viewing of a party to a VT conference and the audio will permit the speaking voice of that party to be heard.

In operation, RTP/RTCP/UDP/IP/PPP conversion unit 126 obtains video and audio data packets from video encoder 120 and audio encoder 122. As mentioned previously, RTP/RTCP/UDP/IP/PPP conversion unit 126 adds appropriate header information to the audio packets and inserts the resulting data within RLP queue 128. Likewise, RTP/RTCP/UDP/IP/PPP conversion unit 126 adds appropriate header information to the video packets and inserts the resulting data within RLP queue 128. MAC layer unit 130 retrieves data from RLP queue 128 and forms MAC layer packets. Each MAC layer packet carries RTP/RTCP/UDP/IP/PPP header information and audio or video packet data that is contained within RLP queue 128. Audio packets may be inserted into RLP queue 128 independently of video packets.

In some cases, a MAC layer packet generated from the contents of RLP queue 128 will carry only header information and video packet data. In other cases, the MAC layer packet will carry only header information and audio packet data. In many cases, the MAC layer packet will carry header information, audio packet data and video packet data, depending on the contents of RLP queue 128. The MAC layer packets may be configured according to a radio link protocol (RLP), and may be referred to as MAC RLP packets. PHY layer unit 132 converts the MAC RLP audio-video packets into PHY layer packets for transmission across channel 116.

Channel 116 carries the PHY layer packets to decoder system 114. Channel 116 may be any physical connection between encoder system 112 and decoder system 114. For example, channel 116 may be a wired connection, such as a local or wide-area wired network. Alternatively, as described herein, channel 116 may be a wireless connection such as a cellular, satellite or optical connection. Channel conditions may be a concern for wired and wireless channels, but may be particularly pertinent for mobile VT applications performed over a wireless channel 16, in which channel conditions may suffer due to fading or congestion. Channel 116 may support a particular network link rate (e.g., a particular bandwidth), which may fluctuate according to channel conditions. For example, channel 116 may be characterized by a reverse link (RL) having a throughput that varies according to channel conditions.

In general, PHY layer unit 134 of decoder system 114 identifies the MAC layer packets from the PHY layer packets and reassembles the content into MAC RLP packets. MAC layer unit 136 then reassembles the contents of the MAC RLP packets to provide video and audio packets for insertion within RLP queue 138. RTP/RCTP/UDP/IP/PPP unit 140 removes the accompanying header information and provides video packets to video decoder 142 and audio packets to audio decoder 144. Video decoder 142 decodes the video data frames to produce a stream of video data for use in driving a display device. Audio decoder 144 decodes the audio data to produce audio information for presentation to a user, e.g., via an audio speaker.

As noted above, system 100 may provide bi-directional video and audio transmission, e.g., for video telephony via transmission channel 116. In some examples, an issue may occur when a network link rate of channel 116 varies, which may occur with Wi-Fi, cellular, or other network links. As described in greater detail with respect to FIG. 2 below, one or more buffers may be included in network equipment to handle rate fluctuations and potentially to perform queue management.

For example, a VT flow with a certain sending rate (e.g., an encoding rate used by video encoder 120) may experience a sudden drop in the link rate, which may create a bottleneck for the flow. Due to a reaction delay at encoder system 112 to this link rate drop (e.g., which may be caused by receiver congestion control feedback delays, delays on the return path from receiver to sender, rate adaptation reaction delays, or the like) the sending rate may stay significantly above the link rate for a period of time. This may result in increased buffer levels at the bottleneck link and, hence, increased end-to-end delay (or even lost packets) between encoder system 112 and decoder system 114, which may adversely affect the quality experience of the VT session.

After encoder system 112 decreases the bit rate at which data is transmitted over channel 116 (e.g., decreases the sending rate), the built-up delay may persist for some time. For example, in some instances, the length of time that the built-up delay persists may depend on the difference between the sending rate and the reduced link rate (e.g., the link rate causing the bottleneck). If the decrease in the sending rate is too small, the built-up delay will decrease relatively slowly, which may impact the user experience at decoder system 114. A conservative sending rate approach is to consistently send at a significantly lower rate than the estimated link rate. However, this approach may result in underuse of the link at channel 116 and an overall reduced video quality experience.

In accordance with the techniques described in this disclosure, video encoder 120 may encode video from video source 118 based on conditions of channel 116. In particular, video encoder 120 may reduce an encoding rate (also referred to herein as a sending rate) based a reduction in bandwidth at channel 116. Reducing the encoding rate may be referred to herein as down-switching. Encoder system 112 may temporarily reduce the sending rate of data encoded at video encoder 120 after a significant drop in the link rate at channel 116 is detected, for example, after a receiver side congestion control feedback message generated at decoder system 114 has been received at encoder system 112.

In one example, according to aspects of this disclosure, encoder system 112 may initially transmit data over channel 116 at a first bit rate. Encoder system 112 may identify a reduction in a network link rate at channel 116 from a first network link rate to a second network link rate. In some examples, encoder system 112 may identify the reduction in the network link rate based on one or more reports received from decoder system 14.

According to aspects of this disclosure, in response to identifying the reduction in the network link rate, encoder system 112 may determine a recovery bit rate at which to transmit the data over channel 116, where the recovery bit rate is less than the second network link rate. Encoder system 112 may also determine a buffering duration that includes a difference between a time of the identification of the reduction in the network link rate and an estimated actual time of the reduction in the network link rate. For example, as noted above, there may be some reaction time associated with identifying the delay and adjusting the rate at which video encoder 120 encodes data. Encoder system 112 may buffer data encoded by video encoder 120 at or near the initial (higher) network link rate until video encoder 120 has time to identify and adjust the encoding rate to a lower rate.

Encoder system 112 may determine a recovery rate duration during which to transmit the data at the recovery bit rate based on the recovery bit rate and the buffering duration. Encoder system may then transmit the data at the recovery bit rate for the determined recovery rate duration. In this way, the techniques may reduce the built-up end-to-end delay relatively quickly and may preserve the quality of the user experience by using the available link rate after the end-to-end delay has been reduced (e.g., versus than maintaining the sending rate at the reduced rate for an extended period of time). While described with respect to encoder system 112 for purposes of example, it should be understood that certain of the above-noted techniques may additionally or alternatively be performed by decoder system 114.

Still other techniques of this disclosure include techniques for up-switching (e.g., increasing) the rate at which data is encoded based on network conditions. For example, during the presentation of "Discussion on Upswitch Principals," SA4 MTSI SWG Conference Call No. 4 on End-to-End Video Rate Adaptation of E2EMTSI-S4, S4-AHM215, Jun. 24, 2014, ("AHM215") a number of issues with up-switching were identified. As documented in "Report from SA4 MTSI SWG Conference Call No. 4 on End-to-End Video Rate Adaptation of E2EMTSI-S4 (Jun. 24, 2014)," Tdoc S4 (14)0768, further discussion was felt needed to investigate the new ideas from the conference call before agreeing on the principles for the up-switch.

In general, the model presented in AHM215 relies on a ramp-up probing model, which may have a disadvantage in that the probing may introduce delay into the system when the probe does not match the channel conditions. A more robust model is to allow a receiver, such as decoder system 114, to passively measure the state of channel 116 to determine whether there could be excess capacity in the system. Based on this, decoder system 114 may make a more accurate estimate of the sustainable rate of the system.

The model presented in AHM215 also suggests a two-phase approach whereby encoder system 112 first probes the channel to see if there might be more capacity. If the probing phase is successful, video encoder 120 may more aggressively increase its rate during a "ramp-up phase." Such a model can introduce a relatively large amount of congestion into the system, because a successful probe with a small increase in data rate may not imply that the system can handle a much larger increase afterwards. In fact, when increasing the rate of video encoder 120 to match the system capacity, the more robust approach is to first to increase the rate by a relatively large amount, followed by taking smaller steps as the rate converges to the sustainable rate supported by channel 116.

To follow the potentially more robust approach of converging on the sustainable rate in the manner described above, the entity driving the adaptation (e.g., the sender (encoder system 112) or receiver (decoder system 114) must have an estimate of the sustainable rate of the system. A sender may rely on RTCP receiver reports to detect end-to-end channel conditions and can calculate the net throughput, albeit with some measurement delay due to the RTCP reporting. A receiver may calculate both a net throughput and an amount of additional delay that may be accepted before packets arrive too late at decoder system 114 for their scheduled playout. Therefore, if the relevant metrics calculated at the receiver are sent directly to the sender, a receiver-driven adaptation model is achieved and may be more robust and should be used in determining the minimum adaptation performance.

According to aspects of this disclosure, decoder system 114 may implement a receiver-driven rate up-switching technique upon determining that the bandwidth at channel 116 is being underutilized. For example, according to aspects of this disclosure, decoder system 114 may provide data to encoder system 112 that prompts video encoder 120 to increase an encoding rate.

In some examples, according to aspects of this disclosure, decoder system 114 may determine an allowable excess delay parameter based on a difference between a time at which data is received by decoder system 114 and a time at which the received data is scheduled to be played out. The allowable excess delay parameter may indicate an amount of delay that is supportable by channel 116 before a user experience is impacted, e.g., data arrives too late to be decoded and played out at the appropriate time. Decoder system 114 may also determine a sender bit rate increase for increasing a bit rate at which data is to be sent from encoder system 112 to decoder system 114 based on the determined allowable excess delay parameter. Decoder system 114 may also transmit an indication of the sender bit rate increase to encoder system 112.

In this way, decoder system 114 may control the average bit rate of the video flow in a controlled manner to improve the user experience without introducing congestion in the network. The techniques may avoid significantly increasing the end-to-end delay, which could result in packet losses.

Figure 2:
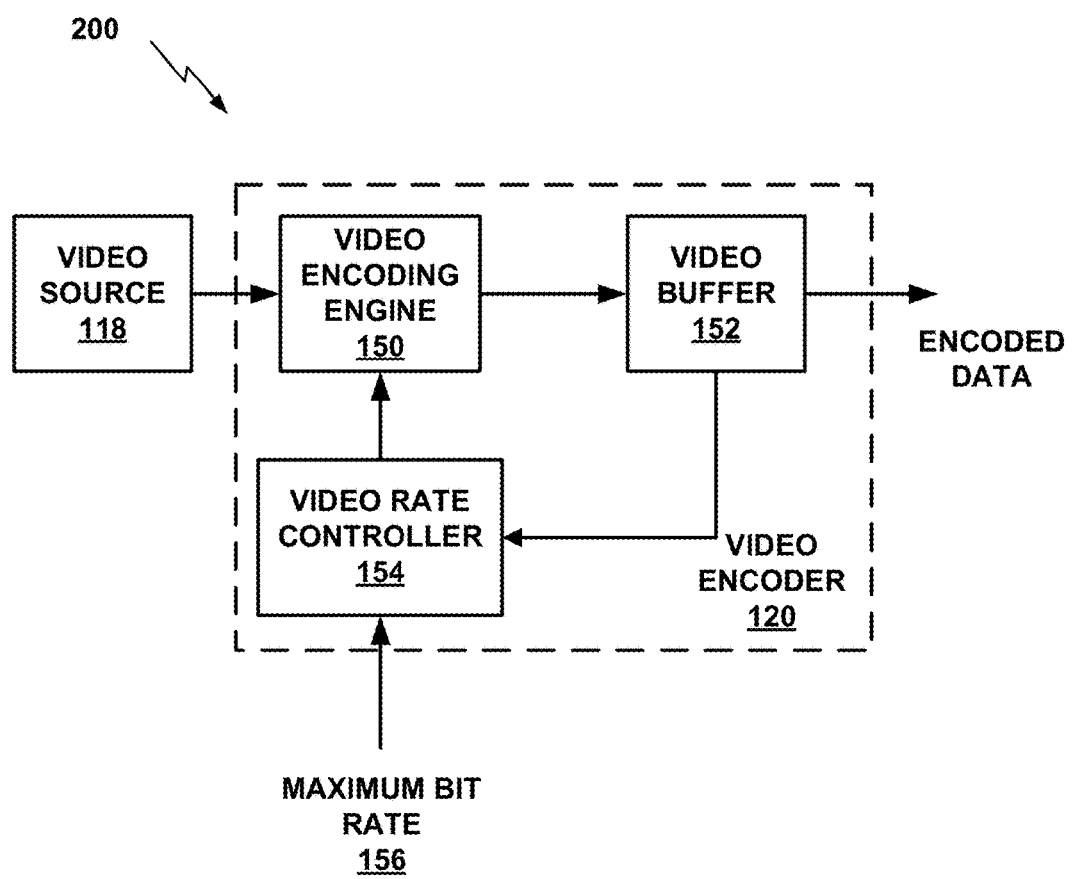
FIG. 2 is a block diagram illustrating a video encoding system that may implement video receiver rate adaptation consistent with the techniques of this disclosure.

FIG. 2 is a block diagram 200 illustrating encoder system 112 that may implement video receiver rate adaptation in accordance with the techniques of this disclosure. As shown in FIG. 2, video encoder 120 includes a video encoding engine 150, video buffer 152 and video rate controller 154. Video encoder 120 also receives maximum target bit rate 156, which may be prepared by decoder system 114 (as described in greater detail below in reference to FIG. 3).

Video encoding engine 150 obtains video data from video source 118 and encodes the video data at a rate controlled by video rate controller 154. Video encoding engine 150 then places the encoded video in video buffer 152, e.g., a memory 152. Video rate controller 154, e.g., a processor 154, may monitor the fullness of video buffer 152 and control the video encoding rate applied by video encoding engine 150, at least in part, based on the fullness. In addition, as described in greater detail below, video rate controller 154 may control the rate based on the network link rate information 156 and/or other data associated with conditions of channel 116 (FIG. 1).

In one example, maximum bit rate 156 may be received via a Temporary Maximum Media Stream Bit Rate Request (TMMBR) message from receiver device with an estimated maximum bit rate for a forward channel to indicate a reduction (or increases) in the encode data rate. In general, as described in RFC 5104 noted above, a receiver, translator, or mixer may use a TMMBR (referred to as a "timber") to request a sender to limit the maximum bit rate for a media stream to, or below, the provided value. The Temporary Maximum Media Stream Bit Rate Notification (TMMBN) contains the media sender's current view of the most limiting subset of the TMMBR-defined limits it has received to help the participants to suppress TMMBRs that would not further restrict the media sender.

It should be understood that, while the techniques of FIG. 2 are described as being carried out by a particular component of FIG. 2 (e.g., such as video rate controller 154), such techniques may additionally or alternatively be performed by one or more other components of a video telephony device. As an example, an MTSI device may carry out certain techniques described above to perform rate adaptation and/or congestion control. In this example, the MTSI device may then provide data to video rate controller 54 for implementing the appropriate rate control at video encoder.

Figure 3:
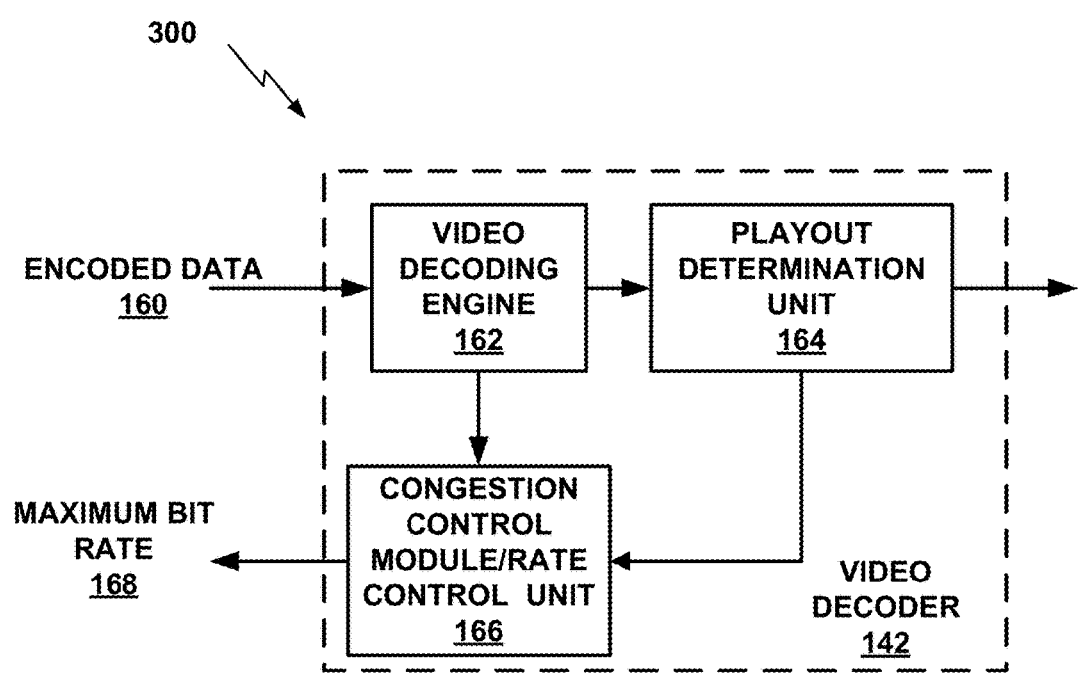
FIG. 3 is a block diagram illustrating a video decoding system that may implement video receiver rate adaptation in accordance with an aspect of the present disclosure.

FIG. 3 is a block diagram illustrating video decoder system 114 that may implement video receiver rate adaptation in accordance with the techniques of this disclosure. As shown in FIG. 3, video decoder 142 receives encoded data and network link rate information 160 and includes a video decoding engine 162, playout determination unit 164, and/or a congestion control module 166 (also referred to as a rate control unit) that generates a rate control data 168, also referred to as maximum bit rate 168.

Video decoding engine 162 receives encoded data and network link rate information 160 and decodes the video data. In some examples, video decoding engine 162 may conform to one or more video coding standards. As noted above, example video coding standards include HEVC, MPEG4, ITU H.263 or ITU H.264. The rate at which the video data is received may be controlled by congestion control module 166, described in detail below in reference to FIG. 5. According to aspects of this disclosure, congestion control module 166 may determine and send maximum bit rate 168 to video encoder 120 for use in adjusting the encoding rate.

In one example, congestion control module 166 may generate a temporary maximum media stream bit rate request (TMMBR) message to the sender device with an estimated maximum bit rate for a forward channel to indicate a reduction in the network link rate. In general, as described in RFC 5104 noted above, a receiver, translator, or mixer may use a TMMBR (referred to as a "timber") to request a sender to limit the maximum bit rate for a media stream to, or below, the provided value. The temporary maximum media stream bit rate notification (TMMBN) contains the media sender's current view of the most limiting subset of the TMMBR-defined limits it has received to help the participants to suppress TMMBRs that would not further restrict the media sender.

Figure 4:
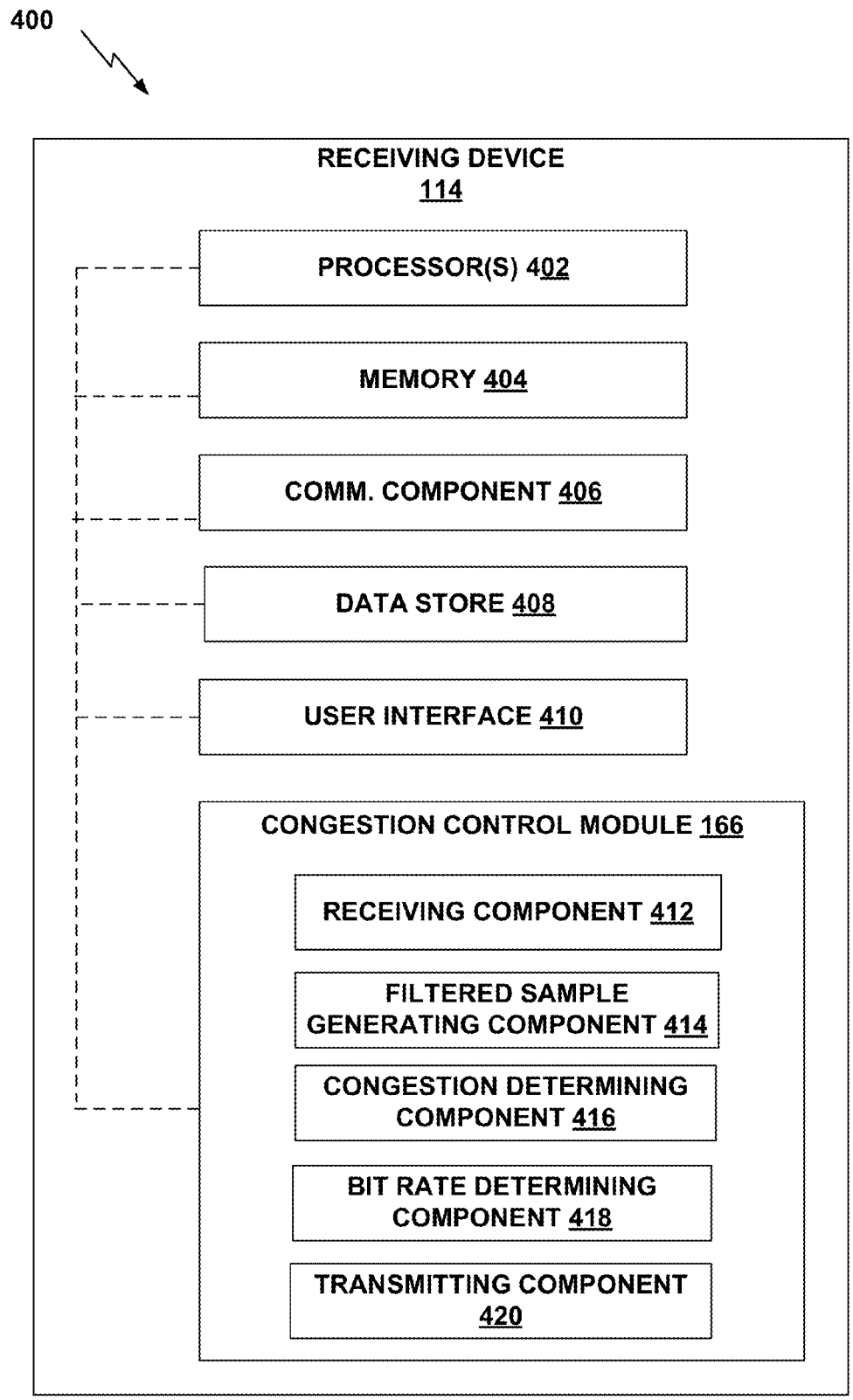
FIG. 4 is a block diagram conceptually illustrating an example hardware implementation for an apparatus employing a processing system configured in accordance with an aspect of the present disclosure.

Referring to FIG. 4, in one implementation, a decoder system or receiving device 114, including congestion control module 166, may be or may include a specially programmed or configured computer device to perform the functions described herein. In one aspect of implementation, congestion control module 166 may include one or more of the following components: a receiving component 412, a filtered sample generating component 414, a congestion determining component 416, a bit rate determining component 418, and/or a transmitting component 420 for congestion control. Additionally, for example as represented by the dashed lines, congestion control module 166 may be implemented in or executed using one or any combination of a processor 402, a memory 404, a communications component 406, and/or a data store 408. For example, congestion control module 166 may be executed on one or more processors 402. Further, for example, congestion control module 166 may be defined as a computer-readable medium stored in memory 404 and/or data store 408 and executed by processor 402. Moreover, for example, inputs and outputs relating to operations of congestion control module 166 may be provided or supported by communications component 406, which may provide a bus between the components of computer device 400 or an interface for communication with external devices or components.

Processor 402 of receiving device 114 may be specially configured to carry out processing functions associated with one or more of components and functions described herein. Processor 402 may include a single or multiple set of processors or multi-core processors. Moreover, processor 402 can be implemented as an integrated processing system and/or a distributed processing system.

Memory 404 of receiving device 114 may be used for storing data used herein and/or local versions of applications and/or instructions or code being executed by processor 402, such as to perform the respective functions of the respective entities described herein. Memory 404 can include any type of memory usable by a computer, such as random access memory (RAM), read only memory (ROM), tapes, magnetic discs, optical discs, volatile memory, non-volatile memory, and any combination thereof.

Communications component 406 provides for establishing and maintaining communications with one or more parties utilizing hardware, software, and services as described herein. Communications component 406 may carry communications between components on receiving device 114 or sending device 112, as well as between user and external devices, such as devices located across a communications network and/or devices serially or locally connected to receiving device 114. For example, communications component 406 may include one or more buses, and may further include transmit chain components and receive chain components associated with a transmitter and receiver, respectively, or a transceiver, operable for interfacing with external devices.

Data store 408, which can be any suitable combination of hardware and/or software, that provides for mass storage of information, databases, and programs employed in connection with aspects described herein. For example, data store 408 may be a data repository for applications not currently being executed by processor 402.

Additionally, receiving device 114 may include a user interface component 410 operable to receive inputs from a user of receiving device 114, and further operable to generate outputs for presentation to the user. User interface component 410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

The various concepts presented throughout this disclosure may be implemented across a broad variety of telecommunication systems, network architectures, and communication standards.

Figure 5:
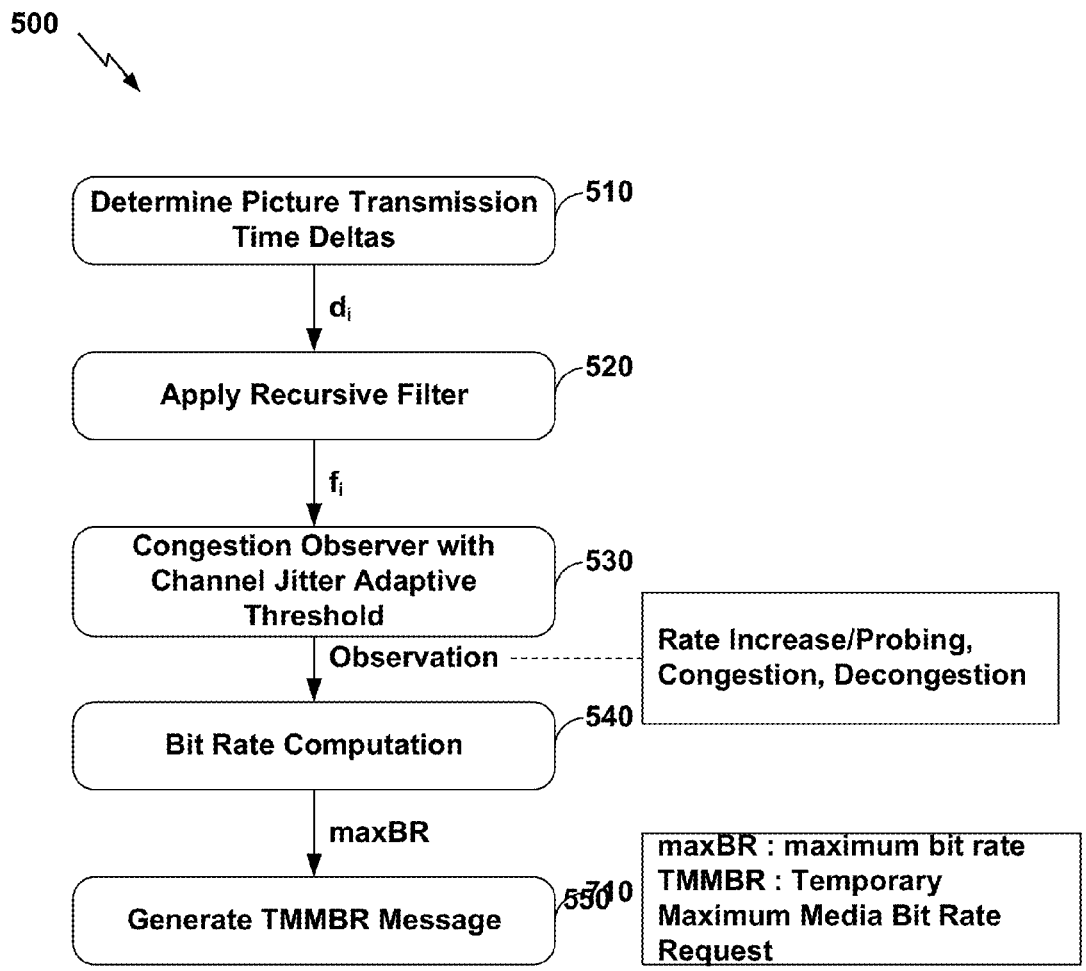
FIG. 5 is an example flow diagram illustrating an example of congestion control in wireless communications in accordance with various aspects of the present disclosure.

FIG. 5 is a flow diagram 500 for congestion control at a device or a sending device (e.g., receiving device 114 or a sending device 112, which may be a user equipment) in accordance with various implementations of the present disclosure. Although the operations described below are presented in a particular order and/or as being performed by an example component, it should be understood that the ordering of the actions and the components performing the actions may be varied, depending on the implementation.

Flow diagram 500 illustrates an example RCC algorithm, for example, at a receiving device 114. In one implementation, at block 510, congestion control module 166 may determine picture transmission time deltas, $d_i$. A picture transmission delta may be defined as a difference between transmission times of two consecutive pictures.

At block 520, congestion control module 166 may apply a recursive filter to the transmission time deltas, $d_i$, to generate filtered samples, $f_i$. In one implementation, the recursive filter may be a smoothing filter with an adaptive weight, $w_i$, with the value of $w_i$ dependent on an estimated sample jitter.

At block 530, congestion control module 166 may analyze the filtered samples, $f_i$, to detect whether congestion or decongestion conditions exist. For example, congestion control module 166 may increase a maximum bit rate, keep the maximum bit rate unchanged, or decrease the maximum bit rate, as described in detail in reference to FIG. 6 below.

At block 540, congestion control module 166, based on whether congestion or decongestion conditions exists, may determine a new maximum bit rate, and, at block 550, transmit the new maximum bit rate in a TMMBR message to the sending device.

Figure 6:
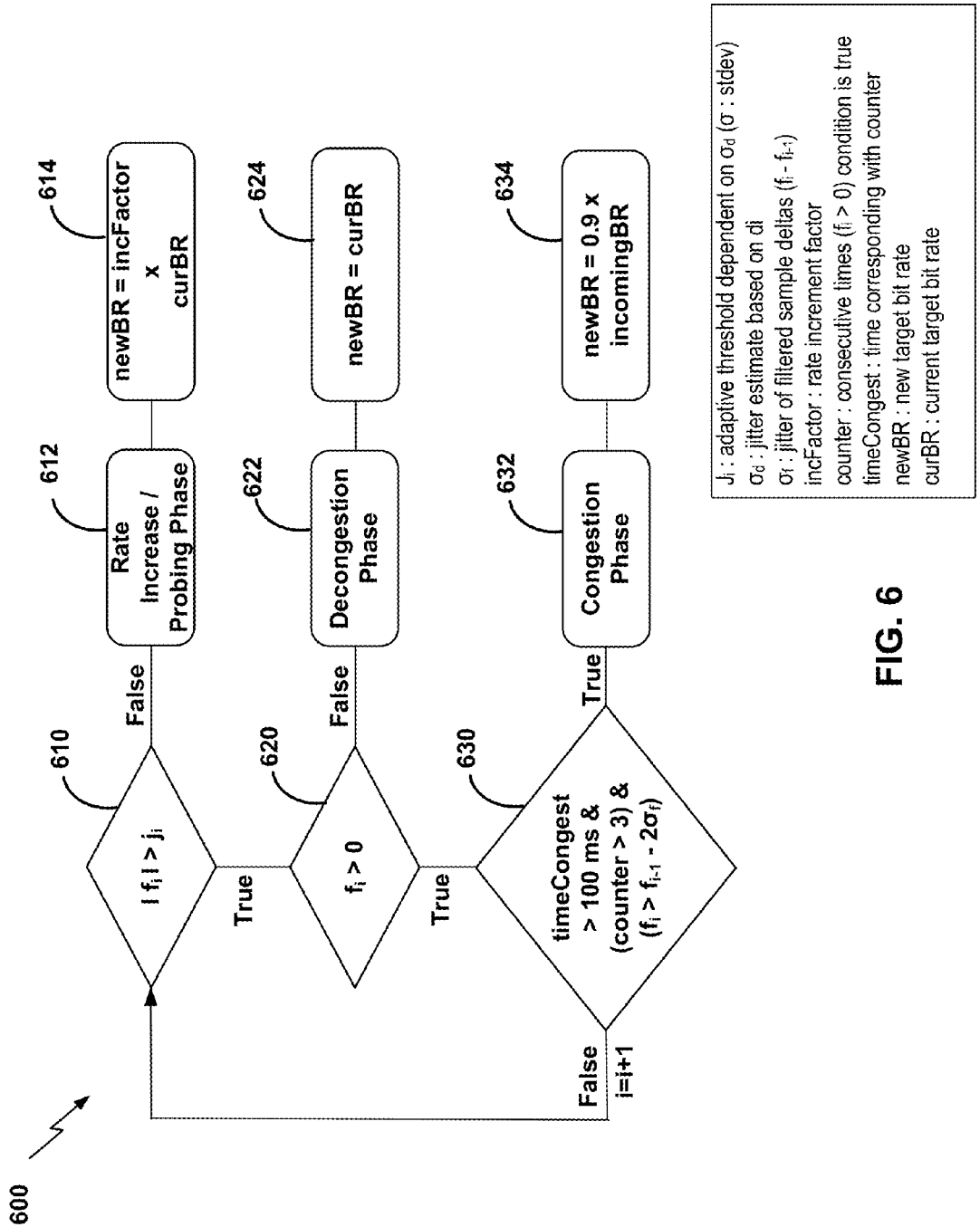
FIG. 6 is an example flow diagram illustrating an aspect of congestion control in wireless communications in accordance with various aspects of the present disclosure.

FIG. 6 is a flow diagram of an example method 600 for congestion control at a device, e.g., receiving device 114 or a sending device 112, which may be a user equipment, in accordance with various implementations of the present disclosure. Although the operations described below are presented in a particular order and/or as being performed by an example component, it should be understood that the ordering of the actions and the components performing the actions may be varied, depending on the implementation.

At block 610, congestion control module 166 may determine whether an absolute value of a filtered sample, e.g., $f_i$, is greater than a threshold, e.g., $j_i$. For example, threshold $j_i$ may be an adaptive threshold which may be dependent on an estimated background jitter. In one implementation, the background jitter may be estimated based on picture transmission time delta jitter, e.g., $\sigma_d$.

In one implementation, adaptive threshold $j_i$ may be dependent on the jitter associated with picture transmission time delta $d_i$. This is to estimate the channel's background jitter by carefully selecting the $d_i$ samples during good channel conditions (for example, a good channel condition may be identified during probing phase when rate is increasing and no congestion/decongestion is detected). The threshold, $j_i$, may also be dependent on adaptive filter weight $w_i$, through the variable k, to compensate for the smoothing strength of the recursive filter. In one implementation, clipping of $j_i$ may be performed (for example, in case an unexpected situation occurs) for smoothing threshold $j_i$ with exponential averaging.

In one implementation, jitter estimates $\sigma_d$ and $\sigma_f$ may be respectively based on standard deviations of $d_i$ samples and $f_i$ sample deltas, e.g., $f_i - f_{i-1}$. The standard deviations may be estimated using exponential moving averages using weight $\beta$ which may be dependent on, for example, frame period estimate $\tau$ and a constant value $\alpha$. In an aspect, the weight $\beta$ may decrease with increase in frame period estimate $\tau$. Additionally, the quality of transmission channel 116 has to be in a good condition in order to obtain a reliable background jitter estimate.

For example, prior to determining standard deviation $\sigma_d$, the condition $|f_i|<0.25*j_{i-1}$ has to be satisfied. Similarly, the standard deviation $\sigma_f$ is determined if the condition $|f_{i-1}|<0.5*j_{i-1}$ is true. Furthermore, sample outliers may be clipped to $\pm 3*\sigma$ before determining the standard deviations. The estimation of $\sigma_r$ using $(d_i - f_{i-1})$ samples is identical to estimation of $\sigma_f$. A non-limiting example for jitter estimation is shown below, including estimating standard deviations $\sigma$ ($\sigma 2$=variance) for variable Y samples $y_i$ representing $d_i$ or $(f_i - f_{i-1})$:

average(Y): $avg_i = \beta * avg_{i-1} + (1-\beta) * y_i$ variance(Y): $var_i = \beta * var_{i-1} + (1-\beta) * (y_i - avg_i) * (y_i - avg_i)$ with $\beta = (1-\alpha)^{0.03\tau}$; $\tau$: frame period estimate [ms]; $\sigma_d$: $\alpha=0.015$; and
σf: $\alpha=0.002$ Method 600 may proceed to block 612 based on a determination that the absolute value of the filtered sample does not satisfy the threshold or is not greater than the threshold. That is, method 600 may proceed to block 612, also referred to as rate increase or probing phase, when congestion control module 166 determines that the absolute value of the filtered sample is either less than or equal to the threshold, e.g., $f_i <= j_i$. This may indicate that there is no significant change in queuing delay, e.g., no significant queuing delay buildup, which may be due to, for example, good channel conditions at receiving device 114. Method may then proceed to block 614, and the congestion control module 166 may increase the maximum target bit rate, also referred to as the maximum bit rate or the target bit rate. In one implementation, congestion control module 116 may increase the maximum target bit rate from the current maximum target bit rate (e.g., curBR) by applying a rate increment factor (e.g., incFactor). For example, new bit rate (e.g., newBR)=incFactor×curBR.

In one implementation, rate increment factor, incFactor, may be used during the increase or probing phase (e.g., block 612) to determine the new maximum target bit rate based on the current maximum target bit rate. The formula for incFactor depends on round trip time (RTT) and the variance $\sigma_r^2$ of the difference samples $(d_i - f_{i-1})$. These dependencies are introduced to have a more conservative incFactor when RTT or jitter is high. In another implementation, in case of a larger RTT, it may take longer before receiving device 114 detects the onset of congestion, hence, a more conservative incFactor may be needed. Additionally, the robustness of RCC may be improved by increasing the rate more slowly (e.g., in case of a large jitter).

Further, for example, a maximum rate step (e.g., max_rate_step) may be determined based on the estimated incoming bit rate and the RTT. The sum of the current maximum target bit rate and the max_rate_step is used as the maximum value for the new maximum target bit rate. The current maximum target bit rate may be increased with 1 second intervals. However, in one implementation, maximum target bit rate reductions may be immediate in case the onset of congestion is detected. A non-limiting example for determining new maximum target bit rate is shown below:

$$newBR = incFactor \times curBR \text{(rate increase/probing phase)}$$

In one implementation, incFactor may be determined as follows:

$$incFactor = 1.005 + \frac{0.24}{1 + e^{0.0025(0.85*RTT+2.0*\sigma_f^2+300)}}$$

Alternatively, in another option from block 610, method 600 may proceed to block 620 based on a determination that the absolute value of the filtered sample is greater than the threshold or satisfies the threshold. That is, method 600 may proceed to block 620 when congestion control module 166 determines that the absolute value of the filtered sample is greater the threshold, e.g., $f_i > j_i$. This may indicate detection of a significant change (e.g., decrease or increase) in queuing delay.

At block 620, congestion control module 166 may determine the sign of the filtered sample, $f_i$. Method 600 may proceed to block 622 based on a determination that the sign of the filtered sample $f_i$ is negative. That is, method 600 may proceed to block 622 when congestion control module 166 determines that the sign of the filtered sample $f_i$ is negative, e.g., $f_i <= 0$. This may indicate detection of a decongestion phase or that the queuing delay is decreasing. In one implementation, at block 622, congestion control module 166 may keep the maximum target bit rate unchanged, e.g., newBR=curBR.

Alternatively, in another option from block 620, method 600 may proceed to block 630 based on a determination that the sign of the filtered sample $f_i$ is positive, e.g., $f_i > 0$. This may indicate that the queuing delay is likely increasing which may mean that the receiving device is entering a congestion phase. In other words, congestion control module 166 may determine that congestion is starting at receiving device 114. In such a scenario, congestion control module 166 may check one or more additional conditions to increase the robustness of RCC. For example, in one implementation, at block 630, congestion control module 166 may increment a counter each time congestion control module 166 performs a check to determine whether a congestion duration satisfies a congestion detection time threshold. In one implementation, the congestion detection time threshold may be set to a value of 100 ms. Additionally, congestion control module 166 may check whether a value of the counter satisfied a counter threshold, e.g., 3, and/or whether the filtered sample, $f_i$, is larger than an immediate previous filtered sample by a filtered sample threshold, e.g., whether the sample $f_i$ is larger than the previous sample $f_{i-1}$ by more than two times the standard deviation, $2\sigma_f$, to take the variation of the filtered samples into account.

Method 600 may proceed to block 632, e.g., a congestion phase, when congestion control module 166 determines that one or more conditions at block 630 are satisfied. At block, 634, based on a determination that the receiving device is in a congestion phase, congestion control module 166 may decrease the new maximum target bit rate. In one implementation, congestion control module 116 may decrease the new maximum target bit rate from the current maximum target bit rate (e.g., curBR) by applying an increment factor (e.g., incFactor). For example, new bit rate (e.g., newBR) =0.9×curBR. That is, the new maximum target bit rate is decreased from the current maximum target bit rate. Alternatively, in another option from block 630, method 600 may proceed to block 610 based on a determination that at least one or more conditions are not satisfied. In such a scenario, congestion control module may proceed to block 610 and the procedure 600 described above is repeated.

In one implementation, after a new maximum target bit rate is available based on the above described RCC algorithm, the packet loss rate is checked. If the loss is greater than a configurable threshold, e.g., 10.1% (e.g., >26/256), then the new maximum target bit rate is clipped with a maximum value equal to the incoming bit rate multiplied with a factor of 0.98. This is used in case of channel conditions.

Thus, congestion control module 166 may control congestion at receiving device 114 for VT.

Figure 7:
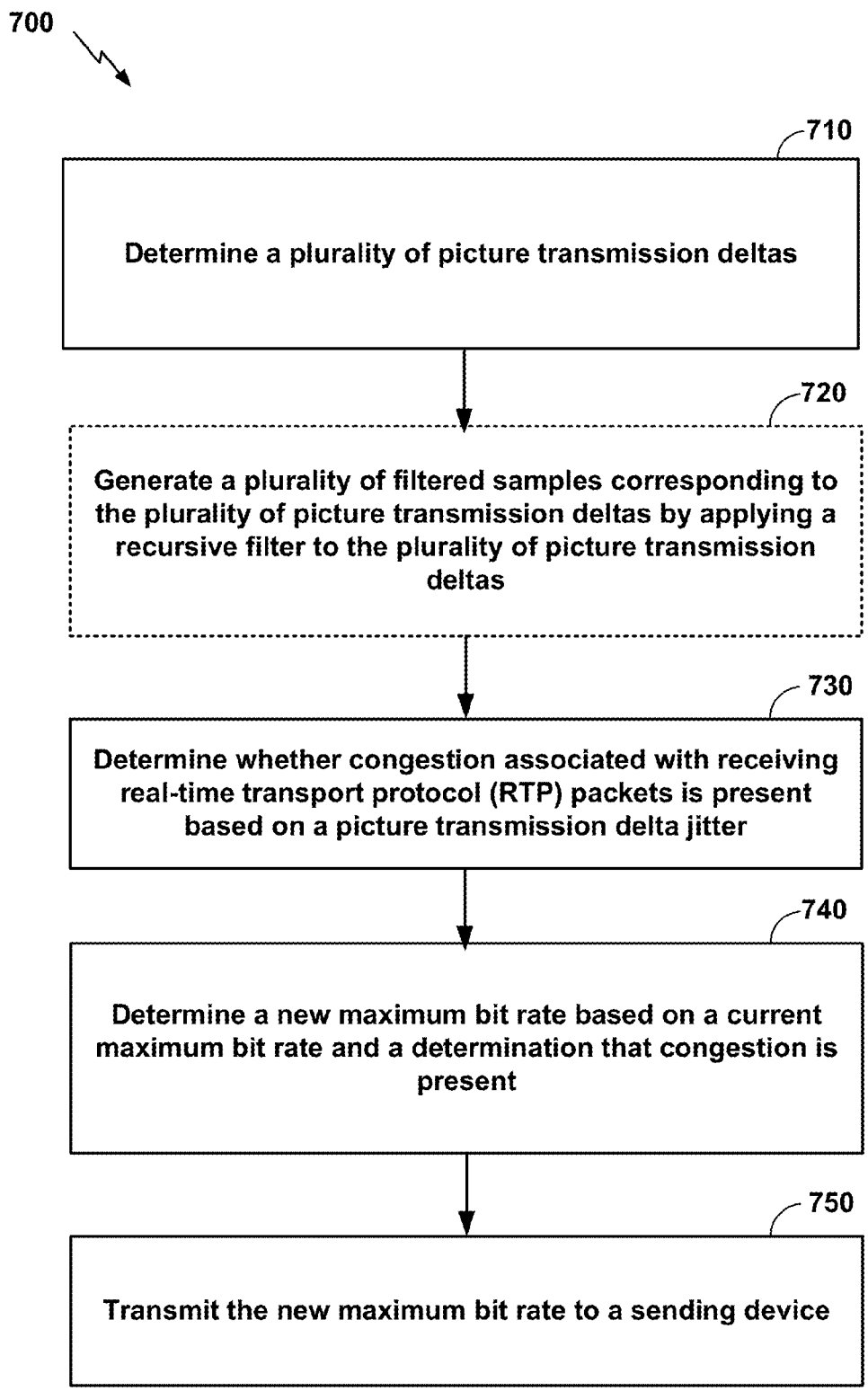
FIG. 7 is a flow diagram illustrating an example method for congestion control in wireless communications in accordance with various aspects of the present disclosure.

Referring to FIG. 7, a receiving device 114 or a sending device 112, e.g., such as a UE, may include one or more processors to perform an aspect of a method 700 for congestion control in wireless communications related to VT. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

At block 710, method 700 includes determining, at a receiving device, a plurality of picture transmission deltas, wherein a picture transmission delta is a difference between transmission times of two consecutive pictures. For example, in an aspect, receiving device 114 and/or congestion control module 166 may include a receiving component 412, such as a specially programmed processor module, or a processor executing specially programmed code stored in a memory to receive, at receiving device 114, a plurality of picture transmission deltas (e.g., a plurality of $d_i$ values). In one implementation, a picture transmission time delta may be determined as a time difference between transmission times of two consecutive pictures with indices i and i–1.

In some aspects, at block 720, method 700 may optionally include generating, at the receiving device, a plurality of filtered samples corresponding to the plurality of picture transmission deltas by applying a recursive filter to the plurality of picture transmission deltas, wherein the recursive filter is based on a picture transmission delta jitter. For example, in an aspect, the receiving device 114 and/or congestion control module 166 may include a filtered sample generating component 414, such as a specially programmed processor module, or a processor executing specially programmed code stored in a memory to generate a plurality of picture transmission deltas. In one implementation, congestion control module 166 may generate (or produce) the filtered samples using a recursive filter on the picture transmission deltas. In another implementation, the recursive filter may be a smoothing filter.

At block 730, method 700 includes determining, at the receiving device, whether congestion associated with receiving real-time transport protocol (RTP) packets is present based on a picture transmission delta jitter. For example, in an aspect, receiving device 114 and/or congestion control module 166 may include a congestion determining component 416, such as a specially programmed processor module, or a processor executing specially programmed code stored in a memory to determine whether congestion associated with the receiving of the RTP packets (e.g., RTP packets of VT) is present based on the picture transmission delta jitter, for example, on which the plurality of filtered samples are based.

At block 740, method 700 includes determining, at the receiving device, a new maximum bit rate based on a current maximum bit rate and a determination that congestion is present. For example, in an aspect, receiving device 114 and/or congestion control module 166 may include a bit rate determining component 418, such as a specially programmed processor module, or a processor executing specially programmed code stored in a memory to determine a new maximum bit rate (newBR) based on the current maximum bit rate (CurBR) and determining that congestion is present.

At block 750, method 700 includes transmitting, from the receiving device, the new maximum bit rate to a sending device. For example, in an aspect, receiving device 114 and/or congestion control module 166 may include a bit rate determining component 418, such as a specially programmed processor module, or a processor executing specially programmed code stored in a memory to transmit the new maximum bit rate (newBR) to sending device 112. In an additional implementation, congestion control module 166 transmit the new maximum bit rate in a TMMBR message to the sending device.

While certain examples described herein have been described with respect to a particular perspective (e.g., being performed by a "sender device" or a "receiver device") it should be understood that the techniques of this disclosure are not limited in this way. For example, as noted above, VT is often a two-way communication flow. Accordingly, similar techniques may be applied on both the forward and reverse. Moreover, while certain devices are shown and described with respect to a certain perspective for purposes of illustration, it should be understood that the devices described herein may have more or fewer components than those shown. As an example, a sender device may incorporate both video encoder 120 (FIG. 2) and video decoder 142 (FIG. 3) and may perform each of the techniques described thereto.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software units or modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of congestion control in wireless communications, comprising:
   determining, at a receiving device, a plurality of picture transmission deltas, wherein a picture transmission delta is a difference between transmission times of two consecutive pictures;
   generating, at the receiving device, a plurality of filtered samples corresponding to the plurality of picture transmission deltas by applying a recursive filter to the plurality of picture transmission deltas, wherein the recursive filter is based on a jitter of the plurality of picture transmission deltas;
   determining, at the receiving device, whether congestion associated with receiving real-time transport protocol (RTP) packets is present based on the jitter of the plurality of picture transmission deltas and the plurality of filtered samples;

determining, at the receiving device, a new maximum bit rate based on a current maximum bit rate and a determination that congestion is present; and transmitting, from the receiving device, the new maximum bit rate to a sending device in response to the determination that congestion is present.

2. The method of claim 1, wherein the new maximum bit rate is transmitted in a temporary maximum media bit rate request (TMMBR) to the sending device.

3. The method of claim 1, wherein a transmission time of a picture is determined at the receiving device as a time difference between a receiving time of a last real-time transport protocol (RTP) packet of the picture and a sending time of a first RTP packet of the picture.

4. The method of claim 1, further comprising:
estimating, at the receiving device, a sample jitter; and
determining an adaptive weight of a smoothing filter based on the estimated sample jitter.

5. The method of claim 4, wherein the adaptive weight is inversely proportional to the estimated sample jitter.

6. The method of claim 4, wherein estimating the sample jitter is based on a standard deviation of one or more picture transmission deltas.

7. The method of claim 1, wherein determining whether the congestion associated with receiving RTP packets is present based on the plurality of filtered samples further comprises:
determining whether an absolute value of a filtered sample of the plurality of filtered samples exceeds an adaptive threshold; and
determining that there is an absence of a queueing delay change in response to determining that the absolute value of the filtered sample of the plurality of samples does not exceed the adaptive threshold, wherein an absence of queueing delay indicates that congestion is not present.

8. The method of claim 7, further comprising:
determining the new maximum bit rate as a product of an increment factor and the current maximum bit rate, wherein the increment factor is greater than one.

9. The method of claim 7, wherein the queueing delay change includes a queueing delay buildup.

10. The method of claim 1, wherein determining whether the congestion associated with receiving RTP packets is present based on the plurality of filtered samples further comprises:
determining whether an absolute value of a filtered sample of the plurality of the filtered samples exceeds an adaptive threshold; and
determining that a queueing delay change is present in response to determining that the absolute value of the filtered sample of the plurality of the filtered samples exceeds the adaptive threshold, wherein the presence of queueing delay indicates that congestion is present.

11. The method of claim 10, further comprising:
determining whether a sign of the filtered sample is negative or positive;
determining that the receiving device is going through a decongestion phase in response to a determination that the sign of the filtered sample is negative; and
configuring the current maximum bit rate as the new maximum bit rate in response to a determination that the receiving device is going through the decongestion phase.

12. The method of claim 10, further comprising:
determining whether a sign of the filtered sample is negative or positive;
determining that the receiving device is going through a congestion phase in response to a determination that the sign of the filtered sample is positive; and
configuring a new maximum bit rate as a reduced factor of an incoming bit rate in response to a determination that the receiving device is going through the congestion phase.

13. The method of claim 12, wherein determining that the receiving device is going through the congestion phase further includes:
determining whether a congestion duration exceeds a congestion detection time threshold;
incrementing a counter in response to a determination that the congestion duration exceeds the congestion detection time threshold;
determining whether a value of the incremented counter a counter threshold;
determining whether the filtered sample is larger than an immediate previous filtered sample by at least a filtered sample threshold value; and
determining that the receiving device is going through the congestion phase in response to determining that the congestion duration exceeds the congestion detection time threshold, the value of the incremented counter exceeds the counter threshold, and the filtered sample is larger than an immediate previous filtered sample by least filtered sample threshold value.

14. The method of claim 12, wherein determining that the receiving device is going through the congestion phase further includes at least one of determining that the congestion duration exceeds a congestion detection time threshold, or determining that the filtered sample is larger than the immediate previous filtered sample by the filtered sample threshold value.

15. The method of claim 13, wherein at least one of the congestion detection time threshold, the counter threshold, or the filtered sample threshold value is configurable at the receiving device.

16. A receiving computing device for congestion control in wireless communications, comprising:
means for determining a plurality of picture transmission deltas, wherein a picture transmission delta is a difference between transmission times of two consecutive pictures;
means for generating a plurality of filtered samples corresponding to the plurality of picture transmission deltas by applying a recursive filter to the plurality of picture transmission deltas, wherein the recursive filter is based on a jitter of the plurality of picture transmission deltas;
means for determining whether congestion associated with receiving real-time transport protocol (RTP) packets is present based on the jitter of the plurality of picture transmission deltas and the plurality of filtered samples;
means for determining a new maximum bit rate based on a current maximum bit rate and a determination that congestion is present; and
means for transmitting the new maximum bit rate to a sending device in response to the determination that congestion is present.

17. A non-transitory computer readable medium having stored thereon computer executable instructions for congestion control in wireless communications, to cause a processor of the computing device to perform operations comprising:

determining a plurality of picture transmission deltas, wherein a picture transmission delta is a difference between transmission times of two consecutive pictures;

generating a plurality of filtered samples corresponding to the plurality of picture transmission deltas by applying a recursive filter to the plurality of picture transmission deltas, wherein the recursive filter is based on a jitter of the plurality of picture transmission deltas;

determining whether congestion associated with receiving real-time transport protocol (RTP) packets is present based on the jitter of the plurality of picture transmission deltas and the plurality of filtered samples;

determining a new maximum bit rate based on a current maximum bit rate and a determination that congestion is present; and transmitting, the new maximum bit rate to a sending device in response to the determination that congestion is present.

18. A receiving computing device for congestion control in wireless communications, comprising:

one or more processors configured to:

determine a plurality of picture transmission deltas, wherein a picture transmission delta is a difference between transmission times of two consecutive pictures;

generate a plurality of filtered samples corresponding to the plurality of picture transmission deltas by applying a recursive filter to the plurality of picture transmission deltas, wherein the recursive filter is based on a jitter of the plurality of picture transmission deltas;

determine whether congestion associated with receiving real-time transport protocol (RTP) packets is present based on the jitter of the plurality of picture transmission deltas and the plurality of filtered samples;

determine a new maximum bit rate based on a current maximum bit rate and a determination that congestion is present; and transmit the new maximum bit rate to a sending device in response to the determination that congestion is present.

19. The receiving computing device of claim 18, wherein a transmission time of a picture is determined as a time difference between a receiving time of a last real-time transport protocol (RTP) packet of the picture and a sending time of a first RTP packet of the picture.

20. The receiving computing device of claim 18, wherein the recursive filter is a smoothing filter, and wherein the one or more processors are further configured to:

estimate a sample jitter; and determine an adaptive weight of the smoothing filter based on the estimated sample jitter.

21. The receiving computing device of claim 18, wherein the one or more processors are further configured to determine whether the congestion associated with receiving RTP packets is present based on the plurality of filtered samples based on:

determining whether an absolute value of a filtered sample of the plurality of filtered samples exceeds an adaptive threshold; and determining that there is an absence of a queueing delay change in response to determining that the absolute value of the filtered sample of the plurality of samples does not satisfy the adaptive threshold, wherein an absence of queueing delay indicates that congestion is not present.

22. The receiving computing device of claim 21, wherein the one or more processors are further configured to:

determine the new maximum bit rate as a product of an increment factor and the current maximum bit rate, wherein the increment factor is greater than one.

23. The receiving computing device of claim 21, wherein the queueing delay change includes a queueing delay buildup.

24. The receiving computing device of claim 18, wherein the one or more processors are further configured to determine whether the congestion associated with receiving RTP packets is present based on the plurality of filtered samples based on:

determining whether an absolute value of a filtered sample of the plurality of the filtered samples exceeds an adaptive threshold; and determining that a queueing delay change is present in response to determining that the absolute value of the filtered sample of the plurality of the filtered samples exceeds the adaptive threshold, wherein the presence of queueing delay indicates that congestion is present.

25. The receiving computing device of claim 24, wherein the one or more processors are further configured to:

determine whether a sign of the filtered sample is negative or positive;

determine that the receiving device is going through a decongestion phase in response to a determination that the sign of the filtered sample is negative; and configure the current maximum bit rate as the new maximum bit rate in response to a determination that the receiving device is going through the decongestion phase.

26. The receiving computing device of claim 24, wherein the one or more processors are further configured to:

determine whether a sign of the filtered sample is negative or positive;

determine that the receiving device is going through a congestion phase in response to a determination that the sign of the filtered sample is positive; and configure a new maximum bit rate as a reduced factor of an incoming bit rate in response to a determination that the receiving device is going through the congestion phase.

27. The receiving computing device of claim 26, wherein the one or more processors are further configured to determine whether the congestion associated with receiving RTP packets is present based on the plurality of filtered samples based on:

determining whether a congestion duration exceeds a congestion detection time threshold;

incrementing a counter in response to a determination that the congestion duration satisfies the congestion detection time threshold;

determining whether a value of the incremented counter exceeds a counter threshold;

determining whether the filtered sample is larger than an immediate previous filtered sample by a filtered sample threshold value; and determining that the receiving device is going through the congestion phase in response to determining that the congestion duration exceeds the congestion detection time threshold, the value of the incremented counter exceeds the counter threshold, and the filtered sample is larger than an immediate previous filtered sample by at least filtered sample threshold value.

28. The receiving computing device of claim 26, wherein the one or more processors are further configured to determine whether the congestion associated with receiving RTP packets is present based on the plurality of filtered samples based on at least one of determining that the congestion duration exceeds a congestion detection time threshold, or determining that the filtered sample is larger than the immediate previous filtered sample by at least the filtered sample threshold value.

* * * * *